(12) United States Patent
Dao et al.

(10) Patent No.: US 8,271,508 B2
(45) Date of Patent: Sep. 18, 2012

(54) AUTOMATED STORAGE AND RETRIEVAL OF DATA

(75) Inventors: Quyen C. Dao, Dillsburg, PA (US); John T. Reel, Newville, PA (US); William D. Reeves, Mechanicsburg, PA (US); Paul L. Snyder, Jerseyville, IL (US)

(73) Assignee: International Business Machines Corporation, Armonk, NY (US)

( * ) Notice: Subject to any disclaimer, the term of this patent is extended or adjusted under 35 U.S.C. 154(b) by 820 days.

(21) Appl. No.: 11/782,183

(22) Filed: Jul. 24, 2007

(65) Prior Publication Data

US 2009/0030873 A1 Jan. 29, 2009

(51) Int. Cl.
*G06F 17/30* (2006.01)

(52) U.S. Cl. .................................................. 707/758

(58) Field of Classification Search ............... 707/770, 707/999.001, 999.003, 999.1
See application file for complete search history.

(56) References Cited

U.S. PATENT DOCUMENTS

| 5,682,524 A | 10/1997 | Freund et al. |
| 5,857,184 A | 1/1999 | Lynch |
| 6,931,408 B2 | 8/2005 | Adams et al. |
| 2002/0123999 A1* | 9/2002 | Bankert et al. .................. 707/10 |
| 2005/0177311 A1 | 8/2005 | Thorne |
| 2006/0004805 A1* | 1/2006 | Grunkemeyer et al. ...... 707/101 |
| 2008/0285626 A1* | 11/2008 | Claus et al. .................... 375/133 |

* cited by examiner

*Primary Examiner* — Syed H Hasan

(74) *Attorney, Agent, or Firm* — Hoffman Warnick LLC; William E. Schiesser

(57) ABSTRACT

The present invention is directed to the automated storage and retrieval of data. A method in accordance with an embodiment of the present invention includes: requesting a data record; broadcasting a query for the requested data record to a plurality of data records in a data center, the query comprising a unique listener key identifying the requested data record and information regarding a requesting program; providing each of the plurality of data records with a listener, wherein each listener actively monitors the broadcasted query to determine if the unique listener key in the broadcasted query matches a unique listener key of the data record associated with the listener; and in the case of a match, automatically transferring the data record with the matching unique listener key from the data center to the requesting program.

12 Claims, 4 Drawing Sheets

AUTOMATED STORAGE AND RETRIEVAL OF DATA

FIELD OF THE INVENTION

The present invention relates to data, and more specifically relates to the automated storage and retrieval of data.

BACKGROUND OF THE INVENTION

Data is typically stored in files on disk or tape devices. To retrieve the data, each file is scanned sequentially or accessed randomly using indexes and keys. This can be a resource intensive process, particularly if there are many files involved or if the file names are not known.

Accordingly, there is a need for a data storage and retrieval methodology that addresses the deficiencies of the related art.

SUMMARY OF THE INVENTION

The present invention relates to the automated storage and retrieval of data. In accordance with an embodiment of the present invention, a data record is provided with a listening mechanism, hereafter referred to as a "listener," that is configured to respond to a centralized, broadcasted query for that data record. The broadcasted query includes a unique listener key that identifies the data record and information regarding the program requesting the data record. The broadcasted query is received by the data record itself, regardless of where the data record is physically located within a data center or the format of the data record. Upon receipt of the broadcasted query, the data record responds by automatically transferring itself to the program requesting the data record. To this extent, the data record automatically retrieves and transfers itself to a requesting program in response to the broadcasted query, regardless of its location within a data center.

A first aspect is directed to a method for retrieving data, comprising: requesting a data record; broadcasting a query for the requested data record to a plurality of data records in a data center, the query comprising a unique listener key identifying the requested data record and information regarding a requesting program; providing each of the plurality of data records with a listener, wherein each listener actively monitors the broadcasted query to determine if the unique listener key in the broadcasted query matches a unique listener key of the data record associated with the listener; and in the case of a match, automatically transferring the data record with the matching unique listener key from the data center to the requesting program.

A second aspect is directed to a system for retrieving data, comprising: a system requesting a data record; a system for broadcasting a query for the requested data record to a plurality of data records in a data center, the query comprising a unique listener key identifying the requested data record and information regarding a requesting program; a system for providing each of the plurality of data records with a listener, wherein each listener comprises a system for actively monitoring the broadcasted query to determine if the unique listener key in the broadcasted query matches a unique listener key of the data record associated with the listener; and a system for automatically transferring the data record with the matching unique listener key from the data center to the requesting program, in the case of a match.

A third aspect is directed to a program product stored on a computer readable medium, which when executed, retrieves data, the computer readable medium comprising program code for: requesting a data record; broadcasting a query for the requested data record to a plurality of data records in a data center, the query comprising a unique listener key identifying the requested data record and information regarding a requesting program; providing each of the plurality of data records with a listener, wherein each listener actively monitors the broadcasted query to determine if the unique listener key in the broadcasted query matches a unique listener key of the data record associated with the listener; and in the case of a match, automatically transferring the data record with the matching unique listener key from the data center to the requesting program.

A fourth aspect is directed to a method for deploying an application for retrieving data, comprising: providing a computer infrastructure being operable to: request a data record; broadcast a query for the requested data record to a plurality of data records in a data center, the query comprising a unique listener key identifying the requested data record and information regarding a requesting program; provide each of the plurality of data records with a listener, wherein each listener actively monitors the broadcasted query to determine if the unique listener key in the broadcasted query matches a unique listener key of the data record associated with the listener; and in the case of a match, automatically transfer the data record with the matching unique listener key from the data center to the requesting program.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
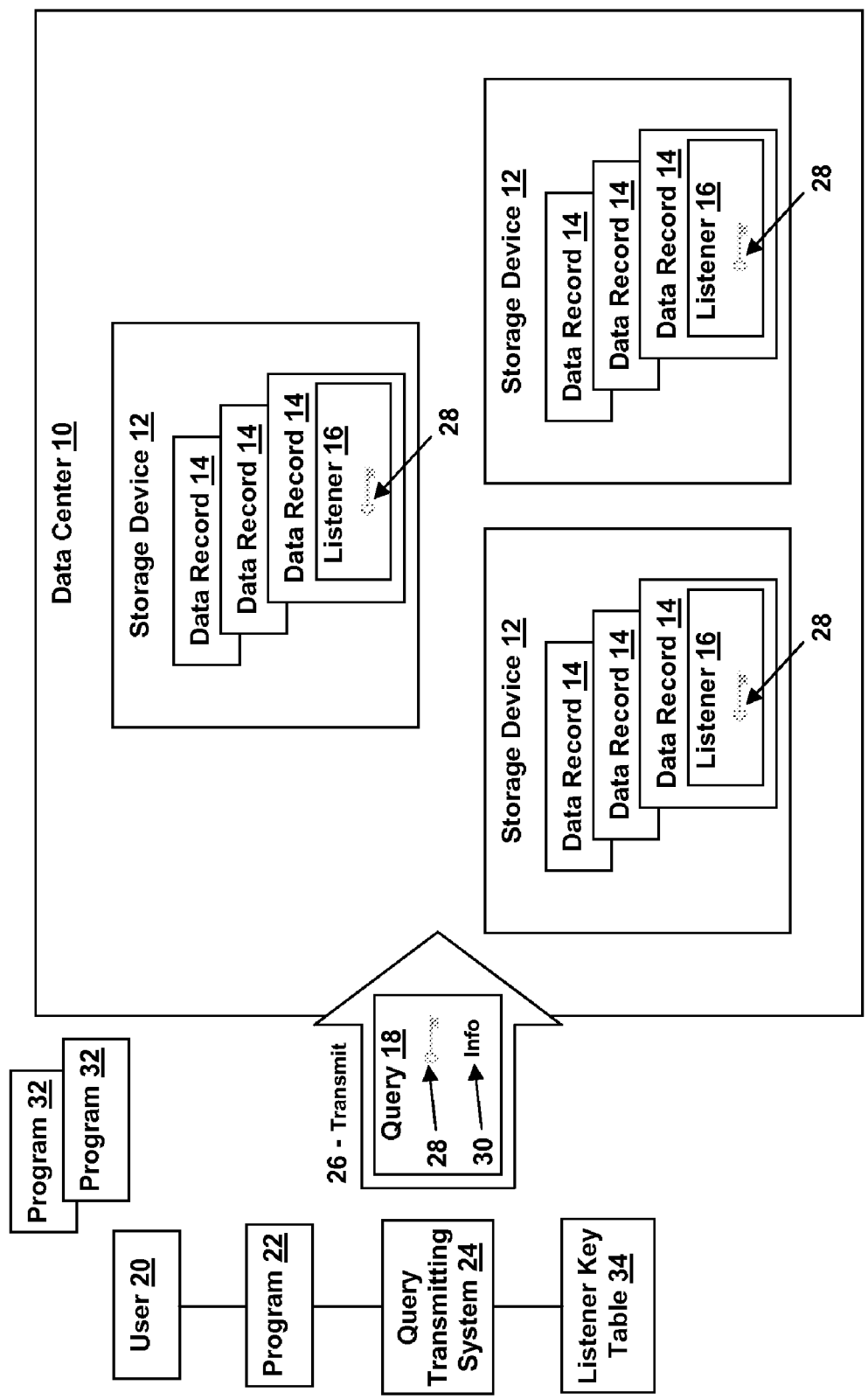
FIG. 1 depicts an illustrative data center in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, the present invention is directed to the automated storage and retrieval of data. In accordance with an embodiment of the present invention, a data record is provided with a listening mechanism, hereafter referred to as a "listener," that is configured to respond to a centralized, broadcasted query for that data record. The broadcasted query includes a unique listener key that identifies the data record and information regarding the program requesting the data record. The broadcasted query is received by the data record itself, regardless of where the data record is physically located within a data center or the format of the data record. Upon receipt of the broadcasted query, the data record responds by automatically transferring itself to the program requesting the data record. To this extent, the data record automatically retrieves and transfers itself to a requesting program in response to the broadcasted query, regardless of its location within a data center.

FIG. 1 depicts an illustrative data center 10 in accordance with an embodiment of the present invention. The data center 10 includes at least one storage device 12, each capable of storing at least one data record 14. A data record 14 can comprise any type of data, for example, insurance claims, bank records, employee records, etc. The storage devices 12 of the data center 10 can be located close together, for example, in the same room or building, and/or can be disposed in geographically separate locations, for example, in different buildings, different cities, etc.

Each data record 14 includes a listener 16 that is configured to continuously monitor for a broadcasted query 18. When a particular data record 14 is requested, for example by a user 20 for use by a program 22, a query transmitting system 24 generates and transmits 26 the query 18 for the requested data record 14 to the storage devices 12 of data center 10. Transmission 26 of the query 18 can be provided at an operating system (OS) level or using any suitable now known or later developed methodology.

The query 18 includes a unique listener key 28 that identifies the requested data record 14. The query 18 also includes information 30 regarding the program 22 requesting the data record 14. When multiple data records 14 are requested, the query 18 can include a unique listener key 28 for each requested data record 14 and its associated information 30. Alternatively, a different query 18 can be provided for each requested data record 14. In another embodiment, the program 22 can request that the data record 14 be provided to one or more other programs 32. In this case, the query 18 includes information 30 regarding the one or more other programs 32.

The unique listener key 28 associated with each data record 14 can be stored in a listener key table 34 or the like that is accessible to the query transmitting system 24. The query transmitting system 24 retrieves the unique listener key 28 associated with a requested data record 14 from the listener key table 34 and includes the retrieved listener key 28 in the query 18. When a given data record 14 is removed (e.g., deleted) from the data center 10, the unique listener key 28 associated with that data record 14 can be assigned to another (e.g., a new) data record 14. The listener key table 34 is updated to reflect any changes.

The listener 16 of each data record 14 in the data center 10 actively monitors all broadcasted queries 18. As such, all of the listeners 16 are simultaneously and actively monitoring all broadcasted queries 18. The listener 16 can be provided as a program or the like that is associated with its respective data record 14. When a listener 16 of a given data record 14 determines that a listener key 28 in a broadcasted query 18 matches its own unique listener key 28, the listener 16 responds by automatically transferring the requested data record 14, based on the information 30 included in the broadcasted query 18, to the program 22 (and/or the one or more other programs 32) requesting the data record 14. In this way, the requested data record 14 automatically retrieves and transfers itself to the requesting program 22 (and/or the one or more other programs 32) in response to the broadcasted query 18, regardless of its location within the data center 10.

Figure 2:
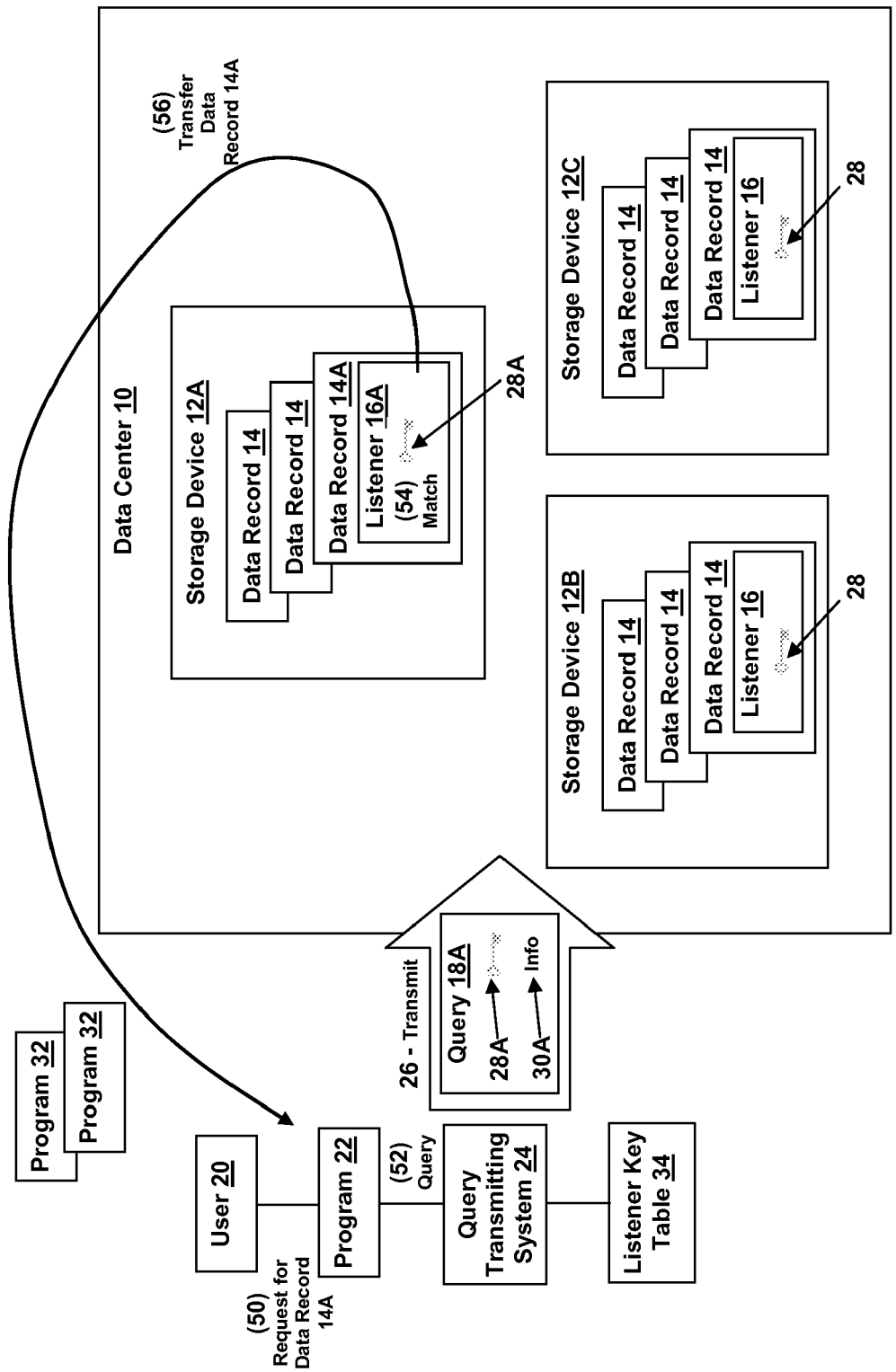
FIGS. 2 and 3 depict hybrid flow diagrams of an illustrative processes in accordance with an embodiment of the present invention.

FIG. 2 depicts a hybrid flow diagram of an illustrative process in accordance with an embodiment of the present invention. In this example, the user 20 has requested (50) a data record 14A for use by the program 22. The data record 14A, which is located on the storage device 12A, has a unique listener key 28A. The query transmission system 24 generates and broadcasts (52) a query 18A for the requested data record 14A to all storage devices 12 of the data center 10. The query 18A includes the listener key 28A obtained from the listener key table 34 and information 30A regarding the requesting program 22.

The listener 16 of each data record 14 in the data center 10 actively monitors all broadcasted queries 18. In this example, the listener 16A of the data record 14A determines (54) that the listener key 28A in the broadcasted query 18A matches its own unique listener key 28A. To this extent, the listener 16A responds by automatically transferring (56) the requested data record 14A, based on the information 30A included in the broadcasted query 18A, from the storage device 12A to the program 22 requesting the data record 14A.

Figure 3:
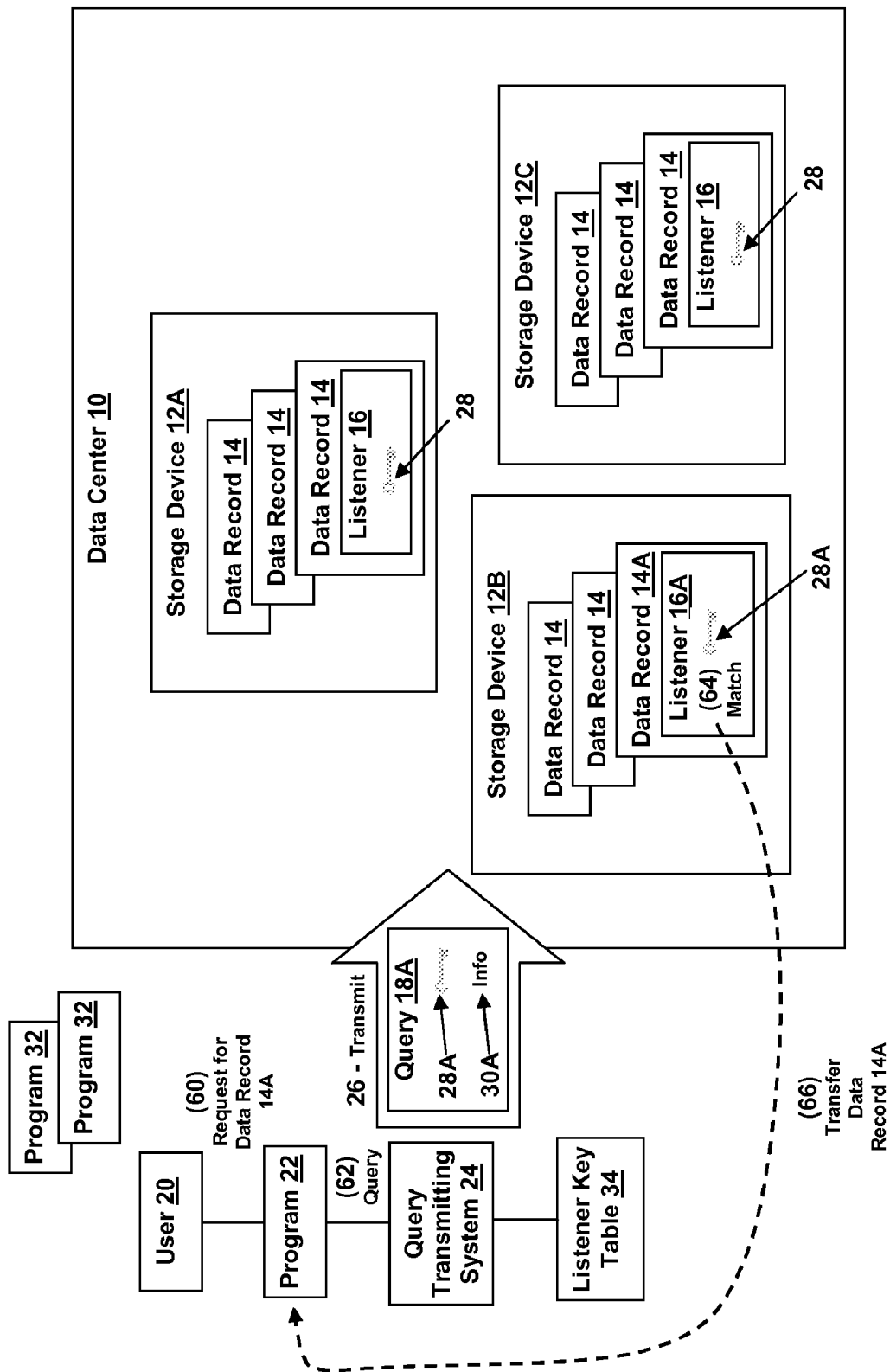

In FIG. 3, the user 20 has requested (60) the same data record 14A for use by the program 22. In this case, however, the data record 14A, which has again has the unique listener key 28A, is located on a different storage device 12B. The query transmission system 24 generates and broadcasts (62) a query 18A for the requested data record 14A to all storage devices 12 of the data center 10. The query 18A includes the listener key 28A obtained from the listener key table 34 and information 30A regarding the requesting program 22.

The listener 16A of the data record 14A determines (64) that the listener key 28A in the broadcasted query 18A matches its own unique listener key 28A. The listener 16A responds by automatically transferring (66) the requested data record 14A, based on the information 30A included in the broadcasted query 18A, from the storage device 12B to the program 22 requesting the data record 14A. Comparing FIGS. 2 and 3, it can be seen that the data record 14A automatically retrieves and transfers itself to the requesting program 22 in response to the broadcasted query 18A, regardless of the storage device 12 in which the data record 14A is stored.

Figure 4:
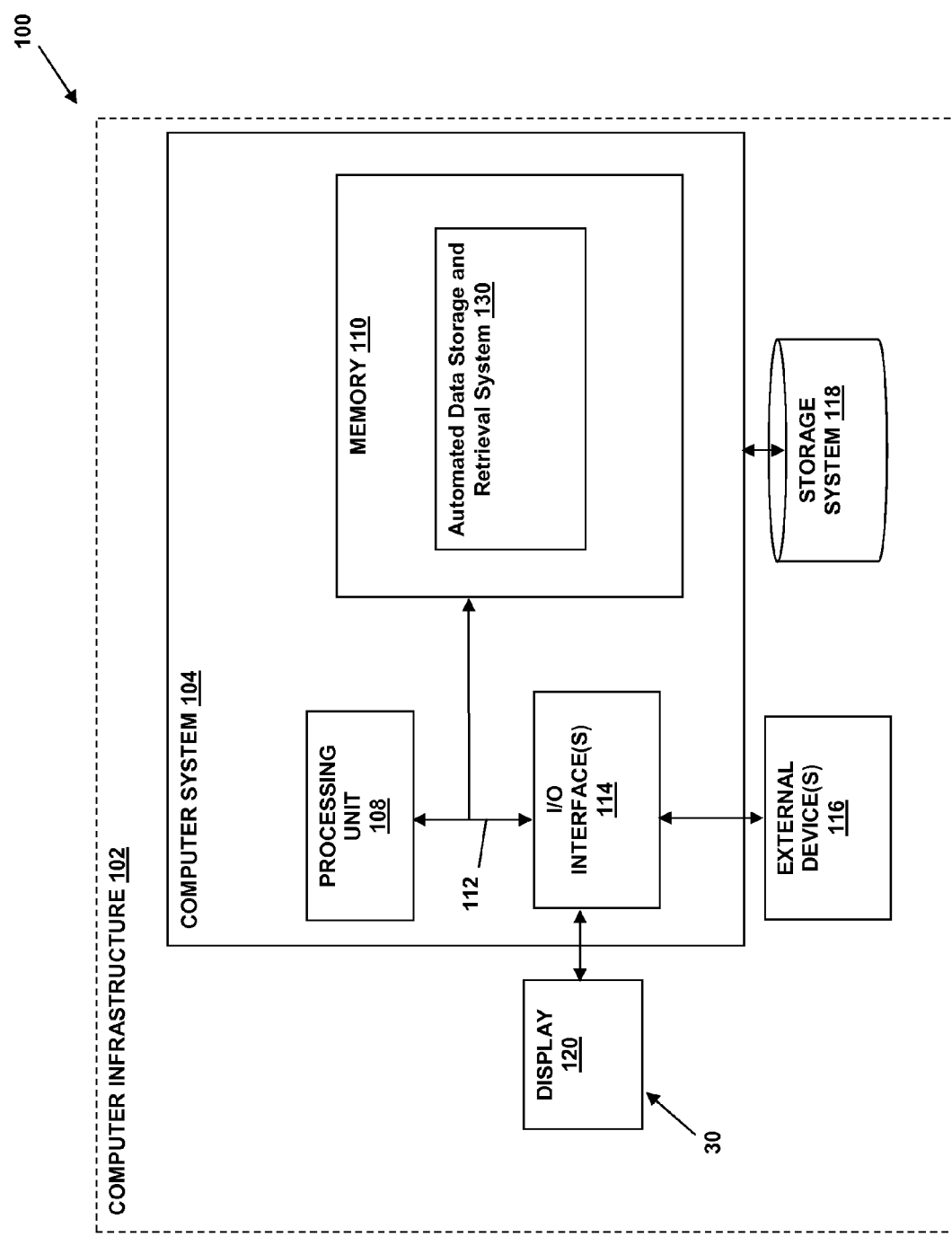
FIG. 4 depicts an illustrative computer system for implementing embodiment(s) of the present invention.

FIG. 4 depicts an illustrative system 100 for automated storage and retrieval of data in accordance with embodiment(s) of the present invention. The system 100 includes a computer infrastructure 102 that can perform the various processes described herein. The computer infrastructure 102 is shown including a computer system 104.

The computer system 104 is shown as including a processing unit 108, a memory 110, at least one input/output (I/O) interface 114, and a bus 112. Further, the computer system 104 is shown in communication with at least one external device 116 and a storage system 118. In general, the processing unit 108 executes computer program code for implementing the present invention, such as the automated data storage and retrieval system 130, that is stored in memory 110 and/or storage system 118. While executing computer program code, the processing unit 108 can read and/or write data from/to the memory 110, storage system 118, and/or I/O interface(s) 114. Bus 112 provides a communication link between each of the components in the computer system 104. The external device(s) 116 can comprise any device (e.g., display 120) that enables a user to interact with the computer system 104 or any device that enables the computer system 104 to communicate with one or more other computer systems.

The computer system 104 can comprise any general purpose computing article of manufacture capable of executing computer program code installed by a user (e.g., a personal computer, server, handheld device, etc.). However, it is understood that the computer system 104 is only representative of various possible computer systems that may perform the various processes of the invention. To this extent, in other embodiments, the computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the computer infrastructure 102 is only illustrative of various types of computer infrastructures that can be used to implement the present invention. For example, in one embodiment, the computer infrastructure 102 comprises two or more computer systems (e.g., a server cluster) that communicate over any type of wired and/or wireless communications link, such as a network, a shared memory, or the like, to perform the various processes of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

It is understood that some of the various systems shown in FIG. 4 can be implemented independently, combined, and/or stored in memory for one or more separate computer systems that communicate over a network. Further, it is understood that some of the systems and/or functionality may not be implemented, or additional systems and/or functionality may be included as part of the system 100.

It is understood that the invention further provides various alternative embodiments. For example, in one embodiment, the invention provides a computer-readable medium that includes computer program code to enable a computer infrastructure to carry out and/or implement the various processes of the present invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 110 and/or storage system 118 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the processes of the invention on a subscription, advertising, and/or fee basis. A service provider can create, maintain, support, etc., a computer infrastructure, such as the computer infrastructure 102, that performs the processes of the invention for one or more customers. In return, the service provider can receive payment from the customer(s) under a subscription and/or fee agreement and/or the service provider can receive payment from the sale of advertising space to one or more third parties.

In still another embodiment, a computer infrastructure, such as the computer infrastructure 102, can be obtained (e.g., created, maintained, having made available to, etc.) and one or more systems for performing the processes of the invention can be obtained (e.g., created, purchased, used, modified, etc.) and deployed to the computer infrastructure. To this extent, the deployment of each system can comprise one or more of (1) installing program code on a computer system, such as the computer system 104, from a computer-readable medium; (2) adding one or more computer systems to the computer infrastructure; and (3) incorporating and/or modifying one or more existing systems of the computer infrastructure, to enable the computer infrastructure to perform the processes of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. The program code can be embodied as one or more types of program products, such as an application/software program, component software/a library of functions, an operating system, a basic I/O system/driver for a particular computing and/or I/O device, and the like.

The foregoing description of the preferred embodiments of this invention has been presented for purposes of illustration and description. It is not intended to be exhaustive or to limit the invention to the precise form disclosed, and obviously, many modifications and variations are possible.

What is claimed is:

1. A method for retrieving data, comprising:
receiving from a requesting program a request for one of a plurality of data records;
broadcasting a query for the requested data record to the plurality of data records in a data center in response to the receiving, wherein the data center stores more than one data record, the query comprising:
a unique listener key identifying the requested data record, wherein the unique listener key identifies one data record in the plurality of data records as the requested data record; and
information regarding the requesting program;
providing each of the plurality of data records with a listener, wherein each listener actively monitors the broadcasted query to determine if the unique listener key in the broadcasted query matches a unique listener key of the data record associated with the listener, and wherein the unique listener key of the data record associated with the listener specifically identifies the data record associated with the listener;
in the case of a match, automatically transferring the data record with the matching unique listener key from the data center to the requesting program;
storing the unique listener key with a plurality of unique listener keys in a listener key table, each unique listener key identifying one specific data record in the plurality of data records;
removing the requested data record from the data center, wherein the removal is in response to the transfer;
reassigning the unique listener key of the removed data record to another data record in the plurality of data records; and
updating the listener key table to reflect the reassignment of the unique listener key.

2. The method of claim 1, further comprising:
assigning a unique listener key to each data record of the plurality of data records; and
storing the plurality of data records in the data center.

3. The method of claim 2, wherein the query comprises a plurality of unique listener keys each identifying a respective requested data record, further comprising:
automatically transferring each data record with a matching unique listener key from the data center to the requesting program.

4. The method of claim 1, wherein each listener simultaneously monitors the broadcasted query.

5. The method of claim 1, wherein the query comprises information regarding a plurality of requesting programs, further comprising:
    automatically transferring the data record with the matching unique listener key from the data center to each of the plurality of requesting programs in the case of a match.

6. A system for retrieving data, comprising:
    at least one computing device including:
        a system for receiving from a requesting program a request for one of a plurality of data records;
        a system for broadcasting a query for the requested data record to the plurality of data records in a data center in response to the receiving, wherein the data center stores more than one data record, the query comprising:
            a unique listener key identifying the requested data record, wherein the unique listener key identifies one data record in the plurality of data records as the requested data record; and
            information regarding the requesting program;
        a system for providing each of the plurality of data records with a listener, wherein each listener comprises a system for actively monitoring the broadcasted query to determine if the unique listener key in the broadcasted query matches a unique listener key of the data record associated with the listener, and wherein the unique listener key of the data record associated with the listener specifically identifies the data record associated with the listener; a system for automatically transferring the data record with the matching unique listener key from the data center to the requesting program, in the case of a match;
        a system for storing the unique listener key with a plurality of unique listener keys in a listener key table, each unique listener key identifying one specific data record in the plurality of data records;
        a system for removing the requested data record from the data center, wherein the removal is in response to the transfer;
        a system for reassigning the unique listener key of the removed data record to another data record in the plurality of data records; and
        a system for updating the listener key table to reflect the reassignment of the unique listener key.

7. The system of claim 6, the at least one computing device further comprising:
    a system for assigning a unique listener key to each data record of the plurality of data records; and
    a system for storing the plurality of data records in the data center.

8. The system of claim 7, wherein the query comprises a plurality of unique listener keys each identifying a respective requested data record, the at least one computing device further comprising:
    a system for automatically transferring each data record with a matching unique listener key from the data center to the requesting program.

9. The system of claim 6, wherein each listener is configured to simultaneously monitor the broadcasted query.

10. The system of claim 6, wherein the query comprises information regarding a plurality of requesting programs, the at least one computing device further comprising:
    a system for automatically transferring the data record with the matching unique listener key from the data center to each of the plurality of requesting programs in the case of a match.

11. A program product stored on a non-transitory computer readable storage medium, which when executed, retrieves data, the non-transitory computer readable storage medium comprising program code for:
    receiving from a requesting program a request for one of a plurality of data records;
    broadcasting a query for the requested data record to the plurality of data records in a data center in response to the receiving, wherein the data center stores more than one data record, the query comprising:
        a unique listener key identifying the requested data record, wherein the unique listener key identifies one data record in the plurality of data records as the requested data record; and
        information regarding the requesting program;
    providing each of the plurality of data records with a listener, wherein each listener actively monitors the broadcasted query to determine if the unique listener key in the broadcasted query matches a unique listener key of the data record associated with the listener, and wherein the unique listener key of the data record associated with the listener specifically identifies the data record associated with the listener;
    in the case of a match, automatically transferring the data record with the matching unique listener key from the data center to the requesting program;
    storing the unique listener key with a plurality of unique listener keys in a listener key table, each unique listener key identifying one specific data record in the plurality of data records;
    removing the requested data record from the data center, wherein the removal is in response to the transfer;
    reassigning the unique listener key of the removed data record to another data record in the plurality of data records; and
    updating the listener key table to reflect the reassignment of the unique listener key.

12. A method for deploying an application for retrieving data, comprising:
    providing a computer infrastructure being operable to:
    receive from a requesting program a request for one of a plurality of data records;
    broadcast a query for the requested data record to the plurality of data records in a data center in response to the receiving, wherein the data center stores more than one data record, the query comprising:
        a unique listener key identifying the requested data record, wherein the unique listener key identifies one data record in the plurality of data records as the requested data record; and
        information regarding the requesting program;
    provide each of the plurality of data records with a listener, wherein each listener actively monitors the broadcasted query to determine if the unique listener key in the broadcasted query matches a unique listener key of the data record associated with the listener, and wherein the unique listener key of the data record associated with the listener specifically identifies the data record associated with the listener;
    in the case of a match, automatically transferring the data record with the matching unique listener key from the data center to the requesting program;
    store the unique listener key with a plurality of unique listener keys in a listener key table, each unique listener key identifying one specific data record in the plurality of data records;

remove the requested data record from the data center, wherein the removal is in response to the transfer;
reassign the unique listener key of the removed data record to another data record in the plurality of data records; and
update the listener key table to reflect the reassignment of the unique listener key.

* * * * *